(12) United States Patent
Saldutti

(10) Patent No.: US 7,896,651 B2
(45) Date of Patent: Mar. 1, 2011

(54) SYSTEM AND METHOD FOR EDUCATIONAL INSTRUCTION

(75) Inventor: Catherine Saldutti, New York, NY (US)

(73) Assignee: Teachers for Learners, LLC, New York, NY (US)

( * ) Notice: Subject to any disclaimer, the term of this patent is extended or adjusted under 35 U.S.C. 154(b) by 896 days.

(21) Appl. No.: 11/729,507

(22) Filed: Mar. 29, 2007

(65) Prior Publication Data

US 2007/0231776 A1    Oct. 4, 2007

Related U.S. Application Data

(60) Provisional application No. 60/786,977, filed on Mar. 29, 2006.

(51) Int. Cl.
*G09B 19/00* (2006.01)

(52) U.S. Cl. .......................... 434/156; 434/170

(58) Field of Classification Search .................. 434/156, 434/157, 170, 188, 193, 207, 236, 238, 365, 434/416, 425, 428, 430
See application file for complete search history.

(56) References Cited

U.S. PATENT DOCUMENTS

| | | | |
|---|---|---|---|
| 3,389,480 A * | 6/1968 | Virginia | 273/272 |
| 3,521,382 A * | 7/1970 | Chauvin | 434/108 |
| 4,443,199 A * | 4/1984 | Sakai | 434/170 |
| 4,478,582 A * | 10/1984 | Tucker | 434/170 |
| 4,613,309 A * | 9/1986 | McCloskey | 434/170 |
| 4,643,683 A * | 2/1987 | Orsini et al. | 434/403 |
| 4,822,283 A * | 4/1989 | Roberts | 434/171 |
| 5,013,245 A * | 5/1991 | Benedict | 434/170 |
| 5,219,289 A * | 6/1993 | Derr | 434/211 |
| 5,487,670 A * | 1/1996 | Leonhardt | 434/167 |
| 5,607,309 A | 3/1997 | Finn | |
| 5,645,431 A | 7/1997 | Dreyfous | |
| 5,704,790 A * | 1/1998 | Moses et al. | 434/209 |
| 5,820,381 A | 10/1998 | Dreyfous | |
| 6,056,549 A * | 5/2000 | Fletcher | 434/112 |
| 6,572,380 B1 * | 6/2003 | Buckley et al. | 434/238 |
| 6,890,180 B2 * | 5/2005 | Sterns et al. | 434/157 |

(Continued)

OTHER PUBLICATIONS http://www.inspiration.com/productinfo/inspiration/index.cfm printed Mar. 27, 2007 (origninally published Feb. 1, 2006).

*Primary Examiner* — Kurt Fernstrom
(74) *Attorney, Agent, or Firm* — DLA Piper LLP (US)

(57) ABSTRACT

A system and method for educational instruction is described. The system and method are useful in teaching subject-based vocabulary and concepts. The system includes a set of learning cards with various indicia related to subjects to be learned, such as vocabulary words, values and symbols. The system also includes first and second education panels capable of receiving and displaying the learning cards in specified patterns or diagrams. According to the method, an instructor introduces the learning cards and places them on the first panel in an arrangement or diagram that relates to the subject lesson. After the lesson is complete, the teacher or students transfer the diagram to the second panel, and place the second panel where it can be easily viewed by the class during subsequent lessons, thus enabling students to see the relationships between the indicia on the learning cards and learn vocabulary words in the context of an entire lesson or unit. In another exemplary embodiment of the invention, the learning cards and panels are provided on a computer system.

18 Claims, 15 Drawing Sheets

U.S. PATENT DOCUMENTS

| | | |
|---|---|---|
| 7,104,798 B2 | 9/2006 | Spaventa |
| 7,137,819 B2 | 11/2006 | Bagüés |
| 7,160,112 B2 | 1/2007 | Kim |
| 7,165,972 B1 | 1/2007 | Jones |
| 7,172,427 B2 * | 2/2007 | Kaul .............................. 434/178 |
| 7,182,600 B2 | 2/2007 | Shaw et al. |
| 7,220,125 B1 * | 5/2007 | Blansett ........................ 434/185 |
| 7,500,852 B2 * | 3/2009 | Wolf et al. .................... 434/188 |
| 7,645,139 B1 * | 1/2010 | Green et al. .................. 434/209 |
| 2006/0286515 A1 * | 12/2006 | Heil .............................. 434/207 |
| 2008/0008983 A1 * | 1/2008 | Wright .......................... 434/236 |

* cited by examiner

| BLACK RECTANGLE | | BLUE RECTANGLE | BROWN RECTANGLE | |
|---|---|---|---|---|
| ACID | IONIC COMPOUND | AVOGADRO'S PRINCIPLE | ACTIVITY SERIES | MOLARITY |
| ALCOHOL | ISOMER | BOYLE'S LAW | ALKALINE | ORGANIC |
| ALKALI METALS | ISOTOPE | CHARLE'S LAW | ATOMIC MASS | PARTIAL PRESSURE |
| ALKALINE EARTH METALS | LIMITING REACTANTS | COMBINED GAS LAW | ATOMIC RADIUS | PRECENT BY MASS |
| ALPHA PARTICLE | METAL | DALTON'S LAW OF PARTIAL PRESSURES | ATOMIC STRUCTURE | PERCENT YIELD |
| ANOIN | METALLOID | | BOILING POINT | PRECISION |
| ANODE | MIXTURE | GAS LAWS | BOILING POINT ELEVATION | PRESSURE |
| AQUEOUS SOLUTION | MOLE | GAY-LUSSAC'S LAW | | SIGNIFICANT FIGURES |
| ATOM | MOLECULAR COMPOUND | GRAHAM'S LAW OF EFFUSION | BOND ENERGY | TEMPERATURE |
| AVOGADRO'S NUMBER | NEUTRONS | | BOND LENGTH | TRANSITION ELEMENT |
| BETA PARTICAL | NOBLE GAS | IDEAL GAS LAW | CALORIE | TRIPLE POINT |
| BINARY ACID | NONMETAL | LAW OF CONSERVATION OF ENERGY | CHEMICAL FORMULA | VOLUME |
| BINARY COMPOUNDS | NUCLEUS | | CHEMICAL PROPERTY | |
| CALORIMETER | OXIDIZING AGENT | LAW OF CONSERVATION OF MATTER | CONCENTRATION | |
| CATALYST | PRECIPITATE | | DENSITY | |
| CATHODE | REACTANTS | OCTET RULE | ELECTRODE POTENTIAL | |
| CATION | REDUCING AGENT | VSEPR THEORY | ELECTRON AFFINITY | |
| COEFFICIENT | SALT | | ELECTRON CONFIGURATION | |
| COLLOID | SATURATED SOLUTION | | ELECTRONEGATIVITY | |
| COMPOUND | SOLID STATE | | END POINT | |
| DIATOMIC MOLECULE | SOLVENT | | ENTROPY | |
| ELECTROCHEMICAL CELL | SUSPENSION | | EQUIVALENCE POINT | |
| ELECTRODE | UNSATURATED SOLUTION | | EXTENSIVE PHYSICAL PROPERTIES | |
| ELECTROLYTE | UNSHARED PAIR | | FORMULA MASS | |
| ELECTROLYTE CELL | VALENCE ELECTRONS | | FREEZING POINT | |
| ELECTRONS | | | FREQUENCY | |
| ELEMENT | | | GROUP | |
| EXCESS REACTANT | | | HALF-LIFE | |
| GASEOUS STATE | | | INORGANIC | |
| HALF-CELL | | | INTENSIVE PHYSICAL PROPERTIES | |
| HALOGEN | | | IONIZATION ENERGY | |
| HETEROGENEOUS MIXTURE | | | MASS | |
| HOMOGENEOUS MIXTURE | | | MASS NUMBER | |
| HYDROCARBONS | | | MELTING POINT | |
| HYDROXIDE ION | | | MOLAR MASS | |
| IDEAL GAS | | | | |
| ION | | | | |

FIG. 13A

| GREEN RECTANGLE | | ORANGE RECTANGLE | BLACK OVAL | BLACK TRIANGLE |
|---|---|---|---|---|
| BOILING | SINGLE REPLACEMENT REACTION | AVTIVATION ENERGY | 6.022 X 10$^{13}$ | MOL (2) |
| CHAIN REACTION | | CHEMICAL BOND | | |
| CHEMICAL CHANGE | SOLUBILITY | COVALENT BOND | ORANGE OVAL | GREEN TRIANGLE |
| CHEMICAL EQUATION | STOICHIOMETRY | DIPOLE | ABSOLUTE ZERO | → (4) |
| CHEMICAL EQUILIBRIUM | SUBLIMATION | DOUBLE BOND | | ↔ |
| CHEMICAL REACTION | VAPORIZATION | ELECTROMAGNETIC RADIATION | | ← |
| COMBUSTION REACTION | | ENERGY | | + (5) |
| CONDENSATION | | ENTHALPY | | |
| DECOMPOSITION REACTION | | EXCITED STATE | | BROWN TRIANGLE |
| DISSOCIATION | | GAMMA RAYS | | % (2) |
| DISSOLVE | | GROUND STATE | | * |
| DOUBLE REPLACEMENT REACTION | | HEAT | | °C |
| EFFUSION | | HYDROGEN BONDING | | °F |
| ELECTROLYSIS | | INTERMOLECULAR FORCES | | atm |
| ENDOTHERMIC REACTION | | IONIC BOND | | K |
| EQUILIBRIUM | | KINETIC ENERGY | | pH |
| ESTERIFICATION | | METALLIC BOND | | STP |
| EVAPORATION | | ORBITAL | | |
| EXOTHERMIC REACTION | | POTENTIAL ENERGY | | ORANGE TRIANGLE |
| FACTOR-LABEL METHOD | | SINGLE BOND | | J |
| FISSION | | | | |
| FREEZING | | | | BLANK SHAPES |
| FREEZING POINT ELEVATION | | | | RECTANGLES (5) |
| FUSION | | | | OVALS (2) |
| HALF-REACTION | | | | TRIANGLES (3) |
| LEWIS DOT STRUCTURE | | | | |
| NEUTRALIZATION | | | | |
| OXIDATION | | | | |
| PHYSICAL CHANGE | | | | |
| PHYSICAL REACTION | | | | |
| RADIOACTIVE DECAY | | | | |
| REACTION RATE | | | | |
| REDOX REACTION | | | | |
| REDUCTION | | | | |
| REVERSIBLE REACTION | | | | |

FIG. 13B

| BLACK RECTANGLE | | BLUE RECTANGLE | RED RECTANGLE | |
|---|---|---|---|---|
| ACTIVE SITE | GENOTYPE | CELL THEORY | ADENINE | PLASMID |
| ADAPTATION | GRADIENT | CENTRAL DOGMA | ALLELE | PROTEIN |
| ANIMAL | HABITAT | LAW OF INDEPENDENT ASSORTMENT | AMINO ACID | RESTRICTION ENZYME |
| ANTIBIOTIC | HELIX | | ANTIBODY | RIBOSOME |
| ANTICODON | HERBIVORE | LAW OF SEGREGATION | B CELLS | SISTER CHROMATIDS |
| ARCHAEBACTERIA | HETEROTROPH | THEORY OF EVOLUTION | CARBOHYDRATE | SPINDLE FIBERS |
| AUTOTROPH | IMMUNE SYSTEM | | CELL | STEM CELLS |
| BACTERIA | J-CURVE | | CELL WALL | STICKY ENDS |
| BACTERIOPHAGE | MUSCULAR SYSTEM | BROWN RECTANGLE | CELLULOSE | T CELLS |
| BASE PAIRS | MUTATION | ABIOTIC | CHLOROPHYLL | THYMINE |
| BIODIVERSITY | NERVOUS SYSTEM | BIOTIC | CHLOROPLAST | URACIL |
| BIOME | NICHE | CONCENTRATION | CHROMOSOME | VACUOLE |
| BIOTECHNOLOGY | OMNIVORE | DIPLOID | CILIA | VIRUS |
| CAPTID | PEDIGREE | DOMINANT | COMPOUND | |
| CARDIOVASCULAR SYSTEM | PHENOTYPE | HAPLOID | CYTOSINE | |
| CARNIVORE | PLANT | HETEROXYGOUS | CYTOSOL | |
| CARRYING CAPACITY | POLYMORPHISM | HOMOZYGOUS | DAUGHTER CELL | |
| CATALYST | POPULATION | HYPERTONIC | DNA POLYMERASE | |
| CENTROMERE | PREDATOR | HYPOTONIC | ENDOPLASMIC RETICULUM | |
| CLONE | PREY | ISOTONIC | ENZYME | |
| CODON | PROBABILITY | RECESSIVE | FLAGELLA | |
| COMPETITION | PRODUCER | SOMATIC | GENE | |
| CONSUMER | PROKARYOTE | | GLUCOSE | |
| DECOMPRESSOR | PUNNETT SQUARE | | GOLGI APPARATUS | |
| DIGESTIVE SYSTEM | REPRODUCTIVE SYSTEM | | GUANINE | |
| DOUBLE HELIX | S-CURVE | | HELICASE | |
| ECOLOGY | SKELETAL SYSTEM | | LIPID | |
| ECOSYSTEM | SPECIES | | LYSOSOME | |
| EMBRYO | TAXONOMY | | MITOCHONDRIA | |
| ENDOCRINE SYSTEM | TISSUE | | MOLECULE | |
| EUKARYOTE | TRAIT | | NUCLEIC ACID | |
| FETUS | TROPHIC LEVEL | | NUCLEOTIDE | |
| FOOD CHAIN | VACCINE | | NUCLEUS | |
| FOOD WEB | ZYGOTE | | ORGAN | |
| FUNGI | | | ORGANELLE | |
| GAMETE | | | PEROXISOME | |
| GENE POOL | | | PHOSPHOLIPID BILAYER | |
| GENETICS | | | PLASMA MEMBRANE | |
| GENOME | | | | |

FIG. 14A

| ORANGE RECTANGLE | RED RECTANGLE | | BLACK OVAL | BLACK TRIANGLE |
|---|---|---|---|---|
| ACTIVATION ENERGY | ADENINE | PLASMID | I | + (4) |
| ENERGY PYRAMID | ALLELE | PROTEIN | II | % |
| SUNLIGHT | AMINO ACID | RESTRICTION ENZYME | | - |
| | ANTIBODY | RIBOSOME | | ♀ |
| | B CELLS | SISTER CHROMATIDS | | ♂ |
| | CARBOHYDRATE | SPINDLE FIBERS | | F1 |
| | CELL | STEM CELLS | | F2 |
| | CELL WALL | STICKY ENDS | | X (2) |
| | CELLULOSE | T CELLS | | Y |
| | CHLOROPHYLL | THYMINE | | |
| | CHLOROPLAST | URACIL | | GREEN TRIANGLE |
| | CHROMOSOME | VACUOLE | | → (4) |
| | CILIA | VIRUS | | ↔ |
| | COMPOUND | | | G1 |
| | CYTOSINE | | | G2 |
| | CYTOSOL | | | PCR |
| | DAUGHTER CELL | | | S |
| | DNA POLYMERASE | | | X |
| | ENDOPLASMIC RETICULUM | | | |
| | ENZYME | | | RED TRIANGLE |
| | FLAGELLA | | | C2H23O6 |
| | GENE | | | CO2 (2) |
| | GLUCOSE | | | DNA |
| | GOLGI APPARATUS | | | H2O (2) |
| | GUANINE | | | mRNA |
| | HELICASE | | | O2 (2) |
| | LIPID | | | RNA |
| | LYSOSOME | | | tRNA |
| | MITOCHONDRIA | | | rRNA |
| | MOLECULE | | | |
| | NUCLEIC ACID | | | BLANK SHAPES |
| | NUCLEOTIDE | | | RECTANGLES (5) |
| | NUCLEUS | | | OVALS (2) |
| | ORGAN | | | TRIANGLES (3) |
| | ORGANELLE | | | |
| | PEROXISOME | | | |
| | PHOSPHOLIPID BILAYER | | | |
| | PLASMA MEMBRANE | | | |

FIG. 14B

SYSTEM AND METHOD FOR EDUCATIONAL INSTRUCTION

CROSS REFERENCE TO RELATED APPLICATIONS

This application claims priority to U.S. Provisional Patent Application No. 60/786,977, filed Mar. 29, 2006, the entire contents of which are incorporated by reference, as if fully set forth herein.

FIELD OF THE INVENTION

This present invention relates to the field of education, and more particularly to a system and method for educational instruction whereby vocabulary words and concepts are taught using a system of various shapes and colors that coordinate concept-building across grade levels and subject areas/disciplines.

BACKGROUND OF THE INVENTION

Understanding and retaining vocabulary is vital to learning new subject matter. Therefore, teachers are always searching for improved ways to teach vocabulary so that students can understand the words' meanings when they are taught, apply the words in their proper context, and retain the words for future use. Further, retention in one subject area fosters conceptual associations and vocabulary building across all areas in which the method is employed.

Most existing methods for teaching vocabulary are designed for teaching only that relating to foreign languages. For example, U.S. Pat. No. 7,104,798 to Spaventa ("Spaventa") discloses an apparatus and method for teaching a foreign language, whereby a teacher introduces vocabulary from a secondary language while the students look at a picture depicting the dialogue. U.S. Pat. No. 7,165,972 to Jones ("Jones") also discloses an apparatus and method for teaching a foreign language. The apparatus essentially comprises a set of cards containing a word, phrase or sentence, in the student's primary language with a pronunciation key, and the corresponding word or phrase in the language to-be-learned, with a visual depiction of the word, phrase or sentence. The student reviews the information in the primary language and associates it with the corresponding information in the secondary language.

The above-described existing systems and methods have several shortcomings, aside from the fact that they teach only the vocabulary of a foreign language. First, even though the students learn the vocabulary in a way that is more exciting than simply reading and memorizing from a book or copying definitions from a dictionary, the students learn the vocabulary in the abstract. For example, in Jones, the students learn the words' meanings by comparing the new word to the known word and the picture and pronouncing the word. However, there is no current system or method for incorporating those individual words into larger or varying contexts in which they are actually used to connect to other concepts or topics. In other words, there is no system designed to ensure comprehension of the vocabulary term as it relates to the concept it describes or expresses. Spaventa's system and method also suffers from the same problem.

Second, the existing systems and methods do not force students to use the words in different contexts where the words have different meanings. For example, one of Jones's cards teaches the word "cart" as an apparatus for moving objects, but it does not teach that cart can be used as a verb; e.g., to transport. Again, Spaventa suffers from the same problem.

Third, the systems and methods described above can only be used in a relatively limited number of ways. For example, Jones's method of teaching is limited due to the fact that the cards cannot be used together, because each one contains a discrete sentence unrelated to other cards' sentences.

Finally, the above-described systems and methods do not disclose an apparatus or method for forcing students to revisit, or consistently use previously-learned vocabulary, throughout future lessons in the same or different subjects. Neither Jones nor Spaventa disclose using the newly-learned foreign vocabulary words in other subjects, such as a science or math lesson. Therefore, the student will not retain the vocabulary words, be able to apply them in the future, or apply the words in different contexts even if they understand the words at the time they are taught.

Accordingly, there is a need for a system and method for teaching vocabulary that: (1) is interactive, stimulating and appeals to students with different learning styles, such as auditory, visual and kinesthetic; (2) is not limited to teaching a foreign language but teaches vocabulary relating to other subjects as well; (3) teaches vocabulary in the service of conceptual knowledge-building; (4) teaches vocabulary in the context in which it is used; (5) provides varying contexts for words, especially those with multiple meanings; (6) can be used to teach vocabulary utilizing various pedagogical approaches; (7) forces students to consistently use or revisit the words during subsequent lessons relating to the same or different subjects; and (8) prompts students to use vocabulary of the academic subject in their speech and writing.

SUMMARY OF THE INVENTION

An exemplary embodiment of the present invention comprises a system for educational instruction comprising at least one learning card having first indicia disposed thereon related to a particular subject area; a first education panel; a second education panel; and wherein the at least one learning card may be coupled to the first education panel or second education panel during the teaching of a lesson related to the particular subject area.

Another exemplary embodiment of the present invention comprises a method of educational instruction comprising the steps of: selecting one or more learning cards related to a particular subject area; teaching a lesson while attaching the one or more learning cards to a first education panel in an arrangement that diagrams the lesson; removing the one or more learning cards from the first panel; and attaching the one or more learning cards to a second education panel, arranged as they were on the first education panel.

Yet another exemplary embodiment of the present invention comprises a computer readable medium having embodied thereon a computer program for processing by a machine, the computer program comprising a first code segment for permitting a user to select one or more virtual learning cards related to a particular subject area; a second code segment for permitting the user to dispose the one or more virtual learning cards on a first virtual education panel in an arrangement that diagrams a lesson related to the particular subject area; and, a third code segment for permitting the user to dispose the one or more virtual learning cards on a second virtual education panel in the same arrangement as the first virtual education panel.

Another exemplary embodiment of the present invention comprises a computer system comprising at least one server computer; and, at least one client computer coupled to the at least one server computer through a network; wherein the at least one server computer includes at least one computer program stored thereon, the at least one computer program being capable of performing the steps of: permitting a user stationed at the at least one client computer to select one or more virtual learning cards related to a particular subject area; permitting the user to dispose the one or more virtual learning cards on a first virtual education panel in an arrangement that diagrams a lesson related to the particular subject area; and, permitting the user to dispose the one or more virtual learning cards on a second virtual education panel in the same arrangement as the first virtual education panel.

Another exemplary embodiment of the present invention comprises a method of educational instruction, comprising the steps of: selecting on a computer screen one or more virtual learning cards related to a particular subject area; teaching a lesson while disposing the one or more virtual learning cards on a first virtual education panel on the computer screen in an arrangement that diagrams the lesson; moving the one or more virtual learning cards from the first virtual education panel to a second virtual education panel on the computer screen, while keeping the one or more virtual learning cards arranged as they were on the first virtual education panel.

BRIEF DESCRIPTION OF THE DRAWINGS

For the purpose of illustrating the invention, there is shown in the drawings forms which are presently preferred; it being understood, that this invention is not limited to the precise arrangements and instrumentalities shown.

FIG. 2A is a top plan view of an exemplary card used in the first exemplary embodiment shown in FIG. 1, showing the vocabulary term "Oxygen Cycle."

FIG. 2B is a top plan view of an exemplary card used in the first exemplary embodiment shown in FIG. 1, showing the vocabulary term "Absolute Zero."

FIG. 2C is a top plan view of an exemplary card used in the first exemplary embodiment shown in FIG. 1, showing the vocabulary term "$H_2O$."

FIG. 13 is a chart of chemistry learning cards for use with the first exemplary embodiment of the present invention, shown in FIGS. 1-8.

FIG. 14 is a chart of biology learning cards with the first exemplary embodiment of the present invention, shown in FIGS. 1-8.

DETAILED DESCRIPTION

Figure 1:
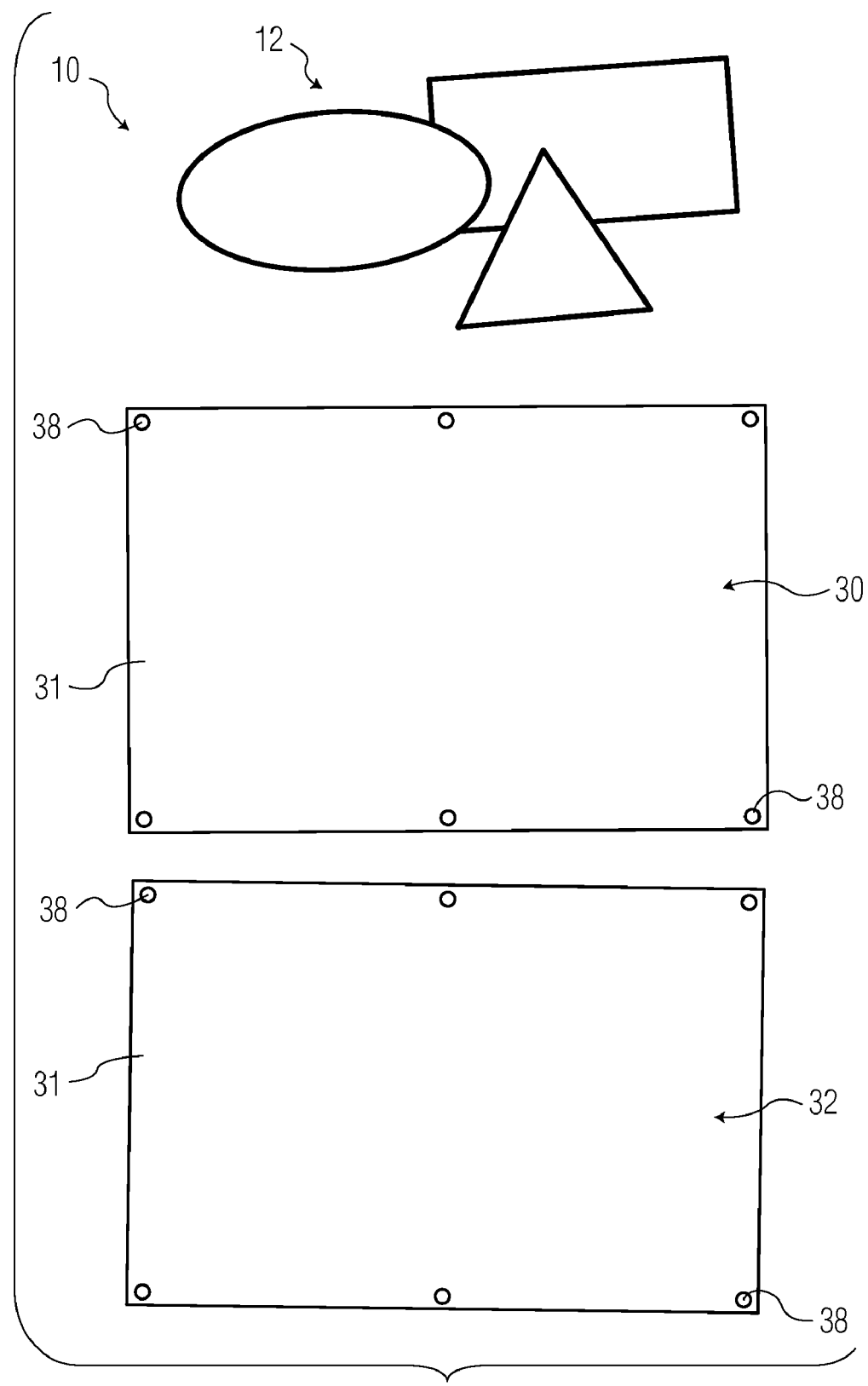
FIG. 1 is a top plan view of a system for educational instruction according to a first exemplary embodiment of the present invention.

The present invention comprises, in a first exemplary embodiment, a system and method for educational instruction which is intended to assist students in building conceptual knowledge in academic areas and learning and retaining vocabulary words that express those concepts. In a second exemplary embodiment, the present invention comprises a computer-implemented system and method for accomplishing the same. It will be appreciated that the following description is intended to refer to exemplary embodiments of the present invention selected for illustration in the drawings, and such exemplary embodiments are not intended to define or limit the present invention.

The present invention essentially comprises a system of vocabulary (learning) cards and display (education) panels, either in tangible form or in virtual (computerized) form. The cards are compiled into subject area sets (e.g., high school biology, Algebra I, middle school physical science, etc.) or accessory packs of smaller numbers of cards (e.g., scientific tools and techniques; prefixes, suffixes and roots, human body systems) that relate to academic subject matter. The system is designed to be flexible enough to allow for variation in curriculum from instructor to instructor, while still maintaining a base of common, high-frequency concepts. In the preferred embodiment, the cards are pre-printed, however, blank cards may be included in each card set, or as a stand-alone accessory pack. The blank cards allow for individual instructor flexibility and vocabulary additions that are particular to the course syllabus.

Each card set and accessory pack across every academic subject area and special topic is preferably systematized by shapes. For example, rectangular cards denote general concepts; triangles represent symbols and characters; ovals represent numerals, etc. Within a single discipline such as science, colors preferably denote concept categories. For example, in science, all red cards, regardless of shape, represent concepts related to "Form, Body, Structure" while blue cards denote "Principle, Theory, Law," etc. As students progress from science class to science class, and from elementary school through college, they can increase the sophistication of their conceptual understandings within this color system. Further, each academic subject area's color categories loosely relate to all other academic subject areas, so as not to confuse the learner as they make conceptual connections from classroom to classroom. For example, in mathematics, blue cards denote "Property, Identity, Theorem" which is loosely related to science's "Principle, Theory Law" category described above with respect to science. This 'color-shape' system makes the present invention stand apart from existing systems and methods, in that it permits coordination of conceptual knowledge-building across disciplines and over time, while also stimulating academic vocabulary acquisition in the service of these concepts.

Besides the cards, the other major component of the present invention is the display panels. According to the exemplary embodiments described below, the system and method involves the use of two display panels, one for use when constructing relationships and understandings, and one for extended display purposes. When learners are building connections among various vocabulary words, they can physically place the cards on the first display panel in relationship to one another in a given context in order to express these connections. As part of the exercise, the learners must explain their arrangement and why they deem it valid. Thus, it acts as a means of vocabulary and conceptual assessment for the instructor. Any number of learners can collaborate to construct this representation, and a variety of exercises, prompts and games may be employed by the instructor in order to accomplish this task. The learners may log notes about the context of study in which this concept is being learned in a designated area on the back of the cards.

After the construction activity (which takes places on the first display panel), the instructor and/or the learners may archive the final, accurate representation or diagram of cards on the second display panel for display in the learning environment. The instructor can prompt students to refer to this second panel during subsequent lessons, asking them to write or speak about the vocabulary and conceptual connections they built. In this way, the second panel adds a layer of instruction that helps students apply their learning in speech and in writing. This makes the instructional method more authentically aligned to the ways in which academic professionals wield vocabulary terms and make conceptual connections, and is yet another reason why this method is different from existing systems and methods.

FIGS. 1-8 show a first exemplary embodiment of a system 10 for educational instruction according to the present invention. In particular, FIG. 1 shows an educational system 10 comprising learning cards 12 of differing shapes and colors, a first education panel 30, and a second education panel 32.

Figure 5A:
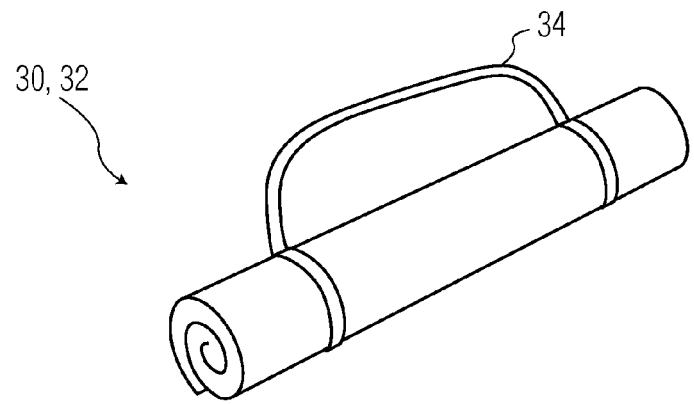
FIG. 5A is a perspective view of the first or second education panel shown in FIGS. 4A and 4B, rolled-up for transportation.
Figure 6:
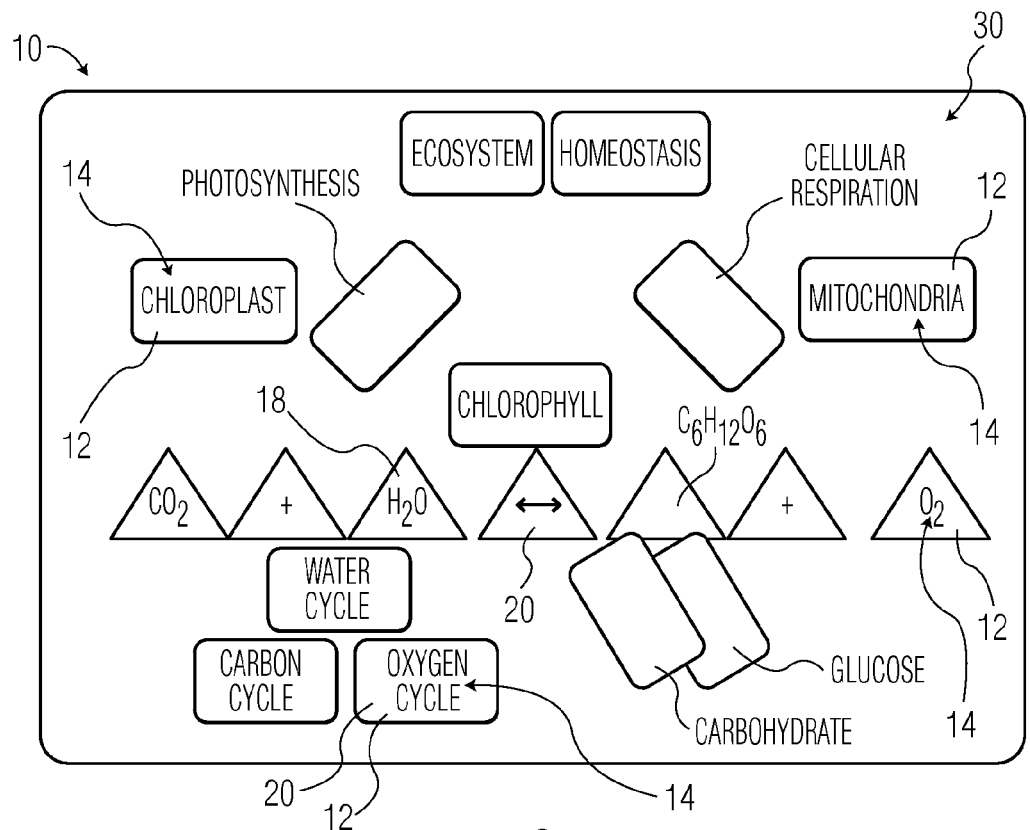
FIG. 6 is a top plan view of the learning cards for use in connection with the first exemplary embodiment, affixed to one of the first or second panels shown in FIGS. 4A and 4B.

The first and second education panels 30, 32 comprise rectangular sheets of a soft, lightweight, flame retardant material 31 with a plurality of holes 38 disposed therein around the periphery. The material 31 can be easily transported, for example, by being rolled-up or folded as shown in FIG. 5A and then carried over the shoulder. Suitable materials may include a semi-rigid membrane, such as rubber, plastic, cardboard, etc. Preferably, the semi-rigid membrane is covered with a material to which the cards 12 may be easily affixed, such as fabric loop to interact with fabric adhesive-backed cards 12, or magnetic to hold magnetic cards 12 (as shown in FIG. 6, and described below) or cards 12 with magnets affixed thereto. Although the first and second education panels 30, 32 look similar, they are used for different purposes in connection with the first exemplary embodiment. For example, the first education panel 30 may be referred to as a "Construxion Site," and the second education panel 32 may be referred to as a "Converse & Convey Panel." The learning cards 12 may be formed in any geometric shape, but according to the first exemplary embodiment, are in the shapes of: rectangles, ovals (or circles) and triangles. Each of these shapes has a specific meaning, as will be described in detail below.

Figure 2A:
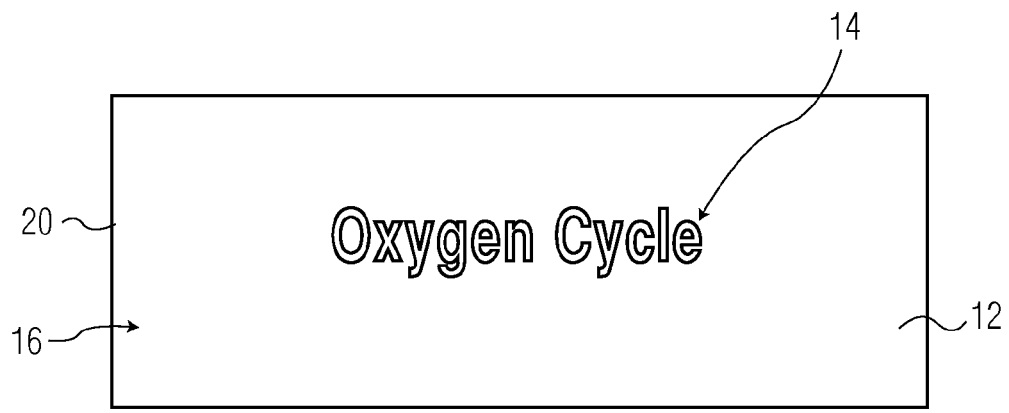
FIGS. 2A-2C is a top plan view of the learning cards used in the embodiment shown in FIG. 1.
Figure 2B:
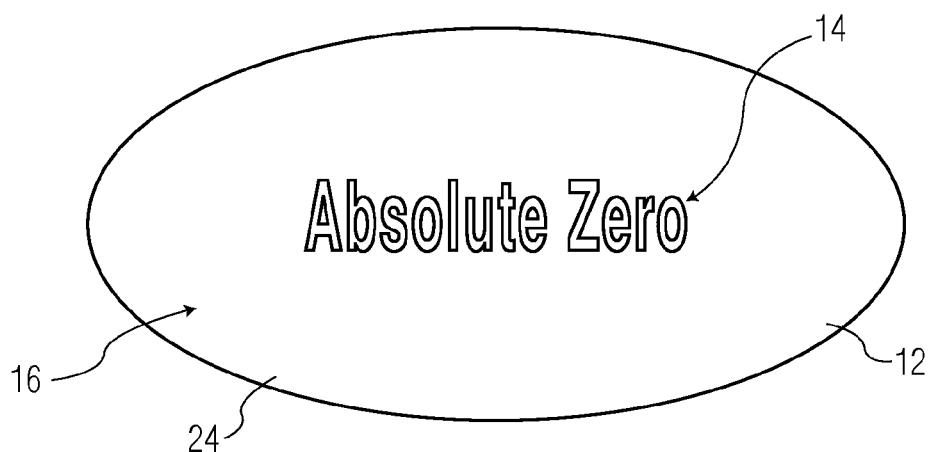
Figure 2C:
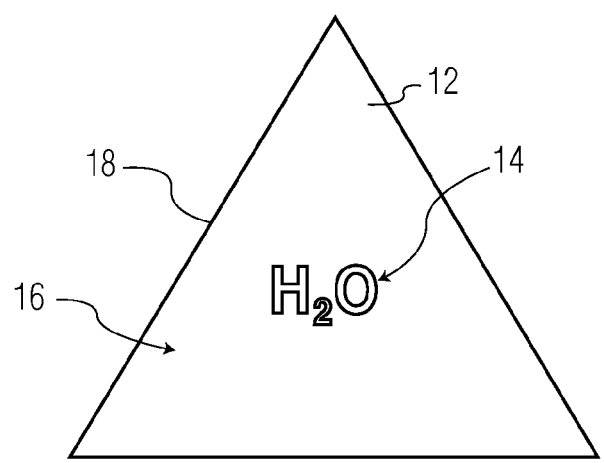

FIGS. 2A-2C show details of some of the learning cards 12 used in the first exemplary embodiment. The learning cards 12 are preferably constructed of a rigid or semi-rigid material such as cardboard, paper, plastic, wood, metal, fiberboard, etc. In the first exemplary embodiment, the learning cards 12 are comprised of any material that is capable of accepting and retaining a wide variety of markings or indicia 14, 16 from ink, marker, lead, solvent-based inks, crayons, grease pencils and the like so that a user (e.g., a teacher/instructor, student, parent or guardian) can mark the learning cards 12 or, so that the learning cards 12 can be pre-printed or marked. Preferably, the learning cards 12 are lightweight and small enough to be easily transported, but may be of any size.

The learning cards 12 may be rectangular (FIG. 2A), triangular (FIG. 2C), and/or oval (FIG. 2B), but, as explained below, could be of any shape. The learning cards 12 contain first indicia 14, which may comprise words or phrases (e.g., "Oxygen Cycle" as shown in FIG. 2A), symbols ("$H_2O$" as shown in FIG. 2C) or values ("Absolute Zero" as shown in FIG. 2B), and second indicia 16 which may comprise colors such as red 18, green 20, blue 22, orange 24, brown 26 and black 28. In the exemplary embodiment shown in FIGS. 2A-2C, the card 12 of FIG. 2A is preferably colored green 20, the card 12 of FIG. 2B is preferably colored orange 24, and the card 12 of FIG. 2C is preferably colored red 18, as shown. Each color has a significance with regard to the present invention, which will be described in detail below.

Preferably, the first indicia 14 relate to vocabulary used in various subject areas taught in school such as math, history, physics, engineering, reading, language, grammar, medicine, law, education, etc. In the first exemplary embodiment, the indicia 14 relate to the general subject of science, and in particular to chemistry, biology and earth science. In the first exemplary embodiment shown in FIGS. 2A-2C, the learning cards 12 have pre-printed indicia 14 relating to chemistry, but those of ordinary skill in the art will realize that the indicia 14 may relate to any subject or topic. FIG. 2A shows a rectangular card 12 with the vocabulary words "Oxygen Cycle" printed thereon. FIG. 2B shows a oval-shaped card 12 with the vocabulary words "Absolute Zero" printed thereon. FIG. 2C shows a triangular card 12 with the chemical symbol for water "$H_2O$" printed thereon. Although the learning cards 12 shown in FIGS. 2A-2C are described as pre-printed with the indicia 14, those of ordinary skill in the art will realize that the learning cards 12 may be produced blank, and the vocabulary terms may be written on the learning cards 12 with a marker or other writing instrument by the teacher or other user.

The second indicia 16 preferably comprises a specific color or colors. As mentioned above, the second indicia 16 may comprise colors such as red 18, green 20, blue 22, orange 24, brown 26, black 28, or other colors such as grey, purple, pink, yellow, white, and variations thereof. In the exemplary embodiment shown in FIGS. 2A-2C, the border and first indicia 14 are colored with the second indicia 16, and the remainder of the card 12 is left white. However, those of ordinary skill in the art will realize that there are many possible variations for implementing the first and second indicia 14, 16 (e.g., the entire card 12 may be colored with the color or colors of the second indicia 16, and the first indicia 14 may be left white; the color or colors of the second indicia 16 may be disposed only on a portion of the card 12, etc.).

Figure 3:
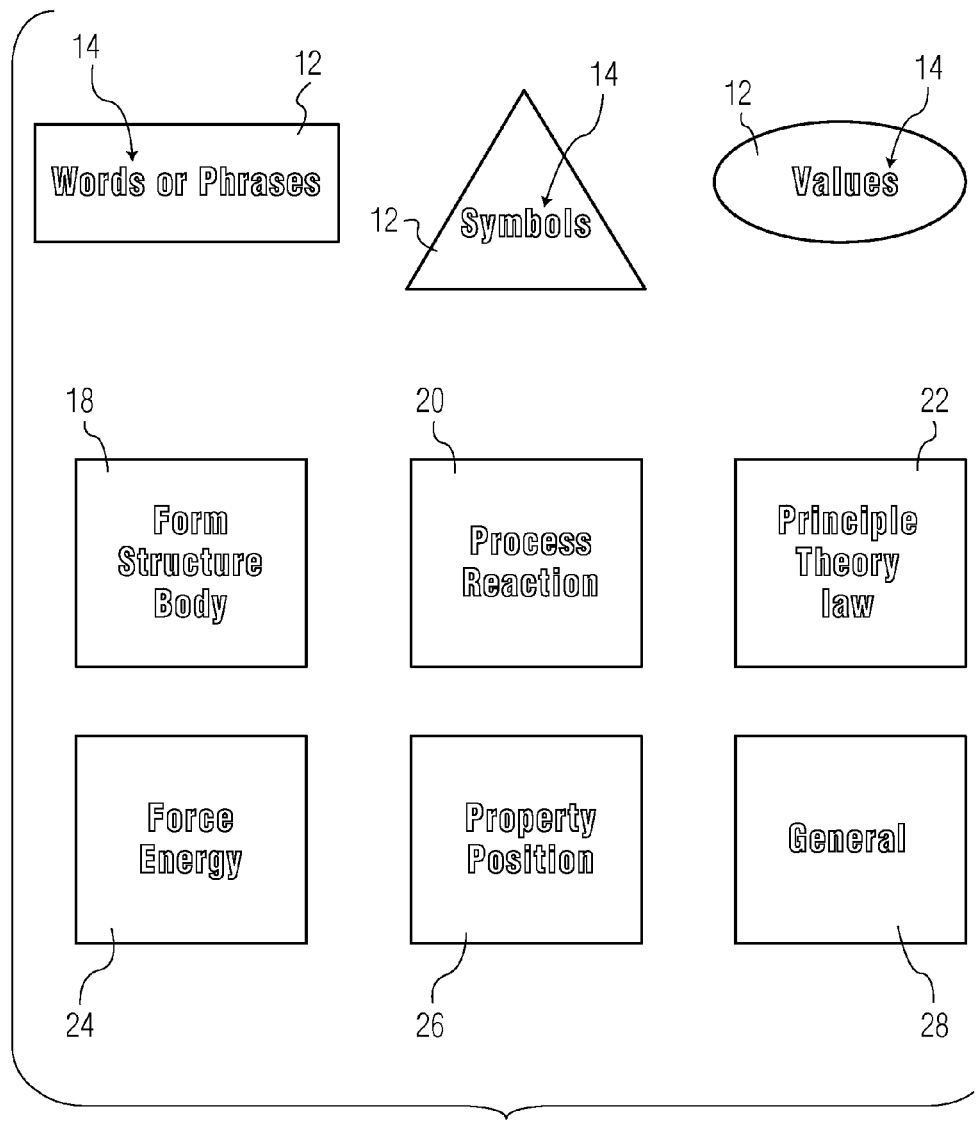
FIG. 3 is a top plan view of a key for use in connection with the first exemplary embodiment shown in FIG. 1, and showing the shape configuration and color indicia of the science subjects learning cards.

As shown in more detail in FIG. 3, the shape and color of the learning cards 12 directly correspond to the meaning of the card within the vocabulary system. For example, in the first exemplary embodiment, rectangular learning cards 12 have words or phrases (e.g., "Oxygen Cycle"), triangular learning cards 12 have symbols ("$H_2O$"), and oval learning cards 12 have values ("Absolute Zero"). Additionally, learning cards 12 relating to 'form, structure or body' have red 18 second indicia 16, learning cards 12 relating to 'process or reaction' have green 20 second indicia 16, learning cards 12 relating to a 'principle, theory or law' have blue 22 second indicia 16, learning cards 12 relating to 'force or energy' have orange 24 second indicia 16, learning cards 12 relating to 'property or position' have brown 26 second indicia 16, and learning cards 12 relating to 'general' principles have black 28 second indicia 16. A non-exhaustive list of the words and phrases, symbols and values, used in the first exemplary embodiment, and the shape and color of respective learning cards 12 is shown in FIGS. 13 and 14.

Although the learning cards 12 according to the first exemplary embodiment are described above as being of rectangular, triangular and oval shapes, those of ordinary skill in the art will realize that the learning cards 12 may be almost any shape including, but not limited to, square, circular, diamond, or any other parallelogram, polygon, quadrilateral or trapezium. Those of ordinary skill in the art will also realize that in some embodiments, the learning cards 12 may all be of the same shape (e.g., all rectangular). Those of ordinary skill in the art will also realize that the system 10 of the first exemplary embodiment may be arranged such that different shapes and colors correspond to different first indicia 14. For example, words or phrases may correspond to triangular learning cards 12, symbols may correspond to oval learning cards 12, values may correspond to rectangular learning cards 12, and so forth. By the same token, learning cards 12 related to 'form, structure or body' may be black 28, learning cards 12 relating to 'force or energy' may be red 18, and so forth.

Although the system 10 described above comprises learning cards 12 relating specifically to science subjects, those of ordinary skill in the art will also realize that the system 10 may comprise learning cards 12 relating to any subject. Furthermore, those of ordinary skill in the art will realize that categories for the first indicia 14, other than the ones described with reference to FIG. 3, may be necessary, depending on the subject being taught. These categories are congruent, if not identical, from discipline to discipline so as to maintain clarity of like concepts and build conceptual connections. For example, the red category for science 'form, structure, body' may include concepts such as 'cell' or 'molecule.' In social studies, this red category instead may be named 'structure or body' and would include concepts such as 'congress' or 'parliament.' In this way, students can move from discipline to discipline using the same color system that helps maintain basic conceptual frameworks for learning.

Figure 4A:
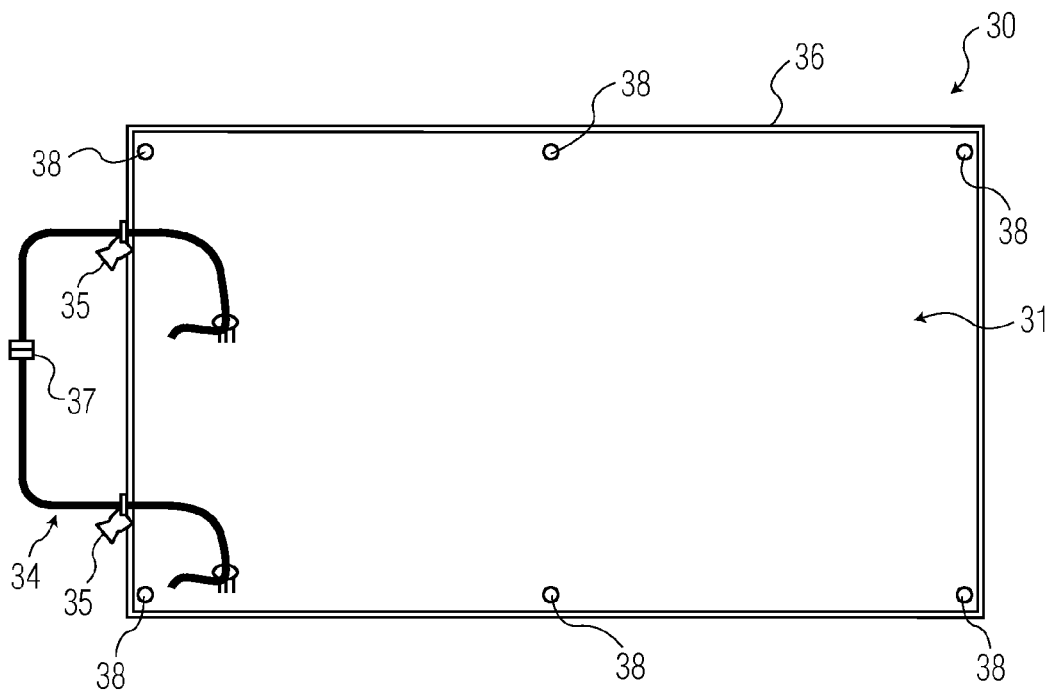
FIG. 4A is a top plan view of a first education panel for use in connection with the first exemplary embodiment shown in FIG. 1.
Figure 4B:
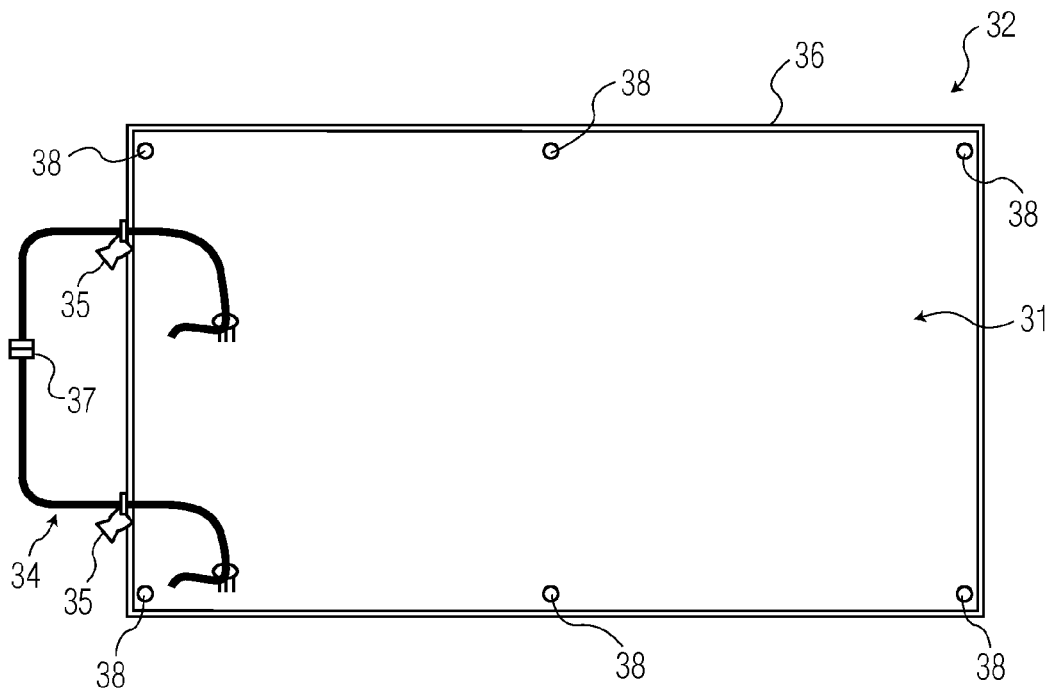
FIG. 4B is a top plan view of a second education panel for use in connection with the first exemplary embodiment shown in FIG. 1.
Figure 7:
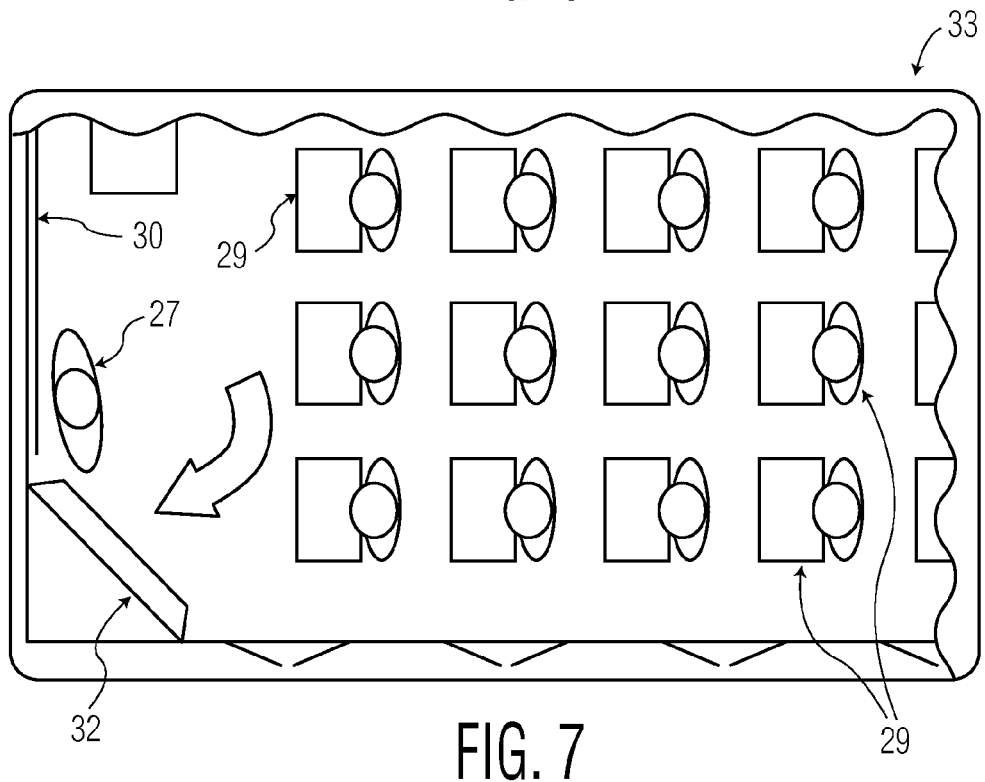
FIG. 7 is a top plan view of the second panel, shown in FIG. 4B, placed within a classroom.

FIGS. 4A and 4B show details of the first and second educational panels 30, 32 used with system 10. In the first exemplary embodiment, the panels 30, 32 have roughly the same configuration (e.g., same size and dimensions). However, those of ordinary skill in the art will realize that the panels 30, 32 may have many different configurations (i.e., sizes and shapes). In the first exemplary embodiment, the panels 30, 32 are rectangular and are approximately sixty (60) inches by forty (40) inches. Preferably, the panels 30, 32 should be large enough so that they can be viewed by a class 33 of students 29, as shown in FIG. 7. The panels 30, 32 are preferably comprised of the same material 31; namely, a soft, flame retardant, lightweight material, as described above. In the first exemplary embodiment, the material 31 is dark colored so that the predominantly white learning cards 12 are easily viewed by the teacher 27 and class 29 when placed thereon. However, those of ordinary skill in the art will realize that the material 31 may be of any suitable color.

The panels 30, 32 preferably include an adjustable strap 34 that is affixed to the material 31 of the panels 30, 32 by sewing or other means known in the art. The adjustable strap 34 may be any flexible, lightweight material (e.g., nylon, cotton, polypropylene, polyester, etc.) that a user can strap to his or her back to carry the panels 30, 32 when they are rolled up, as shown in FIG. 5A. The adjustable strap 34 preferably includes a strap adjuster 37 for adjusting the length of the strap, and clips or buckles 35 for keeping the panels 30, 32 rolled-up for transportation (as shown in FIG. 5A). The panels 30, 32 also preferably include a webbed border 36, so that the panels 30, 32 are finished, and will not fray or tear along the edges.

Figure 5B:
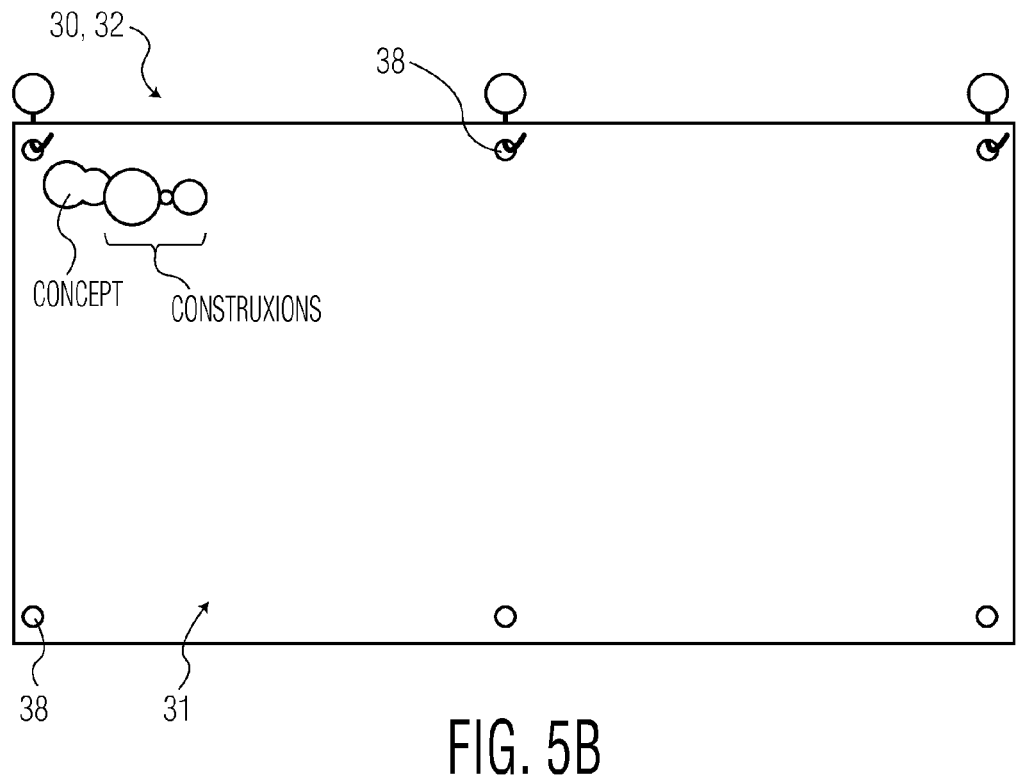
FIG. 5B is a top plan view of the first or second education panel shown in FIGS. 4A and 4B, affixed to a wall.

The panels 30, 32 also preferably include means for hanging or displaying on them on a wall or other flat surface, as shown in FIG. 5B. In the first exemplary embodiment, this means comprises holes 38 which are punched-through the fabric 31 of the panels 30, 32 along the edges, and which are reinforced with metal or plastic grommets. Because the panels 30, 32 are lightweight, they may be securely hung by attachment means such as screws, nails, etc. The panels 30, 32 may also be attached to a wall or other surface via known attachment means such as fabric adhesives, glue, friction fit, suction cups, etc. Alternatively, the panels 30, 32 may be built into the wall (or walls) of a classroom 33 (FIG. 7) or other place of instruction (such as is done with blackboards and whiteboards).

A method of instruction utilizing the above-described system 10 will now be explained in detail. FIG. 7 shows the first education panel 30 (e.g., "Construxion Site") and second education panels 32 (e.g., "Converse & Convey Panel") displayed in a classroom 33. Preferably, the second education panel 32 is displayed off to the side of the first education panel 30 because the second panel 32 should be easily viewed, but does not necessary need to be physically-accessible as does the first panel 30, as described below. Although a particular arrangement of the first and second panels 30, 32 is described above, those of ordinary skill in the art will realize that the first 30 and second 32 panels may be displayed in any suitable location in the classroom 33.

FIG. 6 shows a detail view of the first education panel 30 with various learning cards 12 attached. Each card 12 has at least one attachment means (not shown) for attaching the card to the panels 30, 32. In the first exemplary embodiment, this attachment means comprises a small fabric adhesive attachment member affixed to the rear side of the card 12 (i.e., the side opposite the indicia 14). The fabric adhesive attachment member preferably attaches the card 12 to corresponding felt material 31 of the first 30 and second 32 panels. This configuration allows students 29 and teachers 27 to easily attach and remove the learning cards 12 to and from the panels 30, 32. Those of ordinary skill in the art will realize that many different attachment means may be used to affix the learning cards 12 to the panels 30, 32, including, but not limited to, magnets, glue, tape, tacks, Sticky Tack™, etc.

Figure 8:
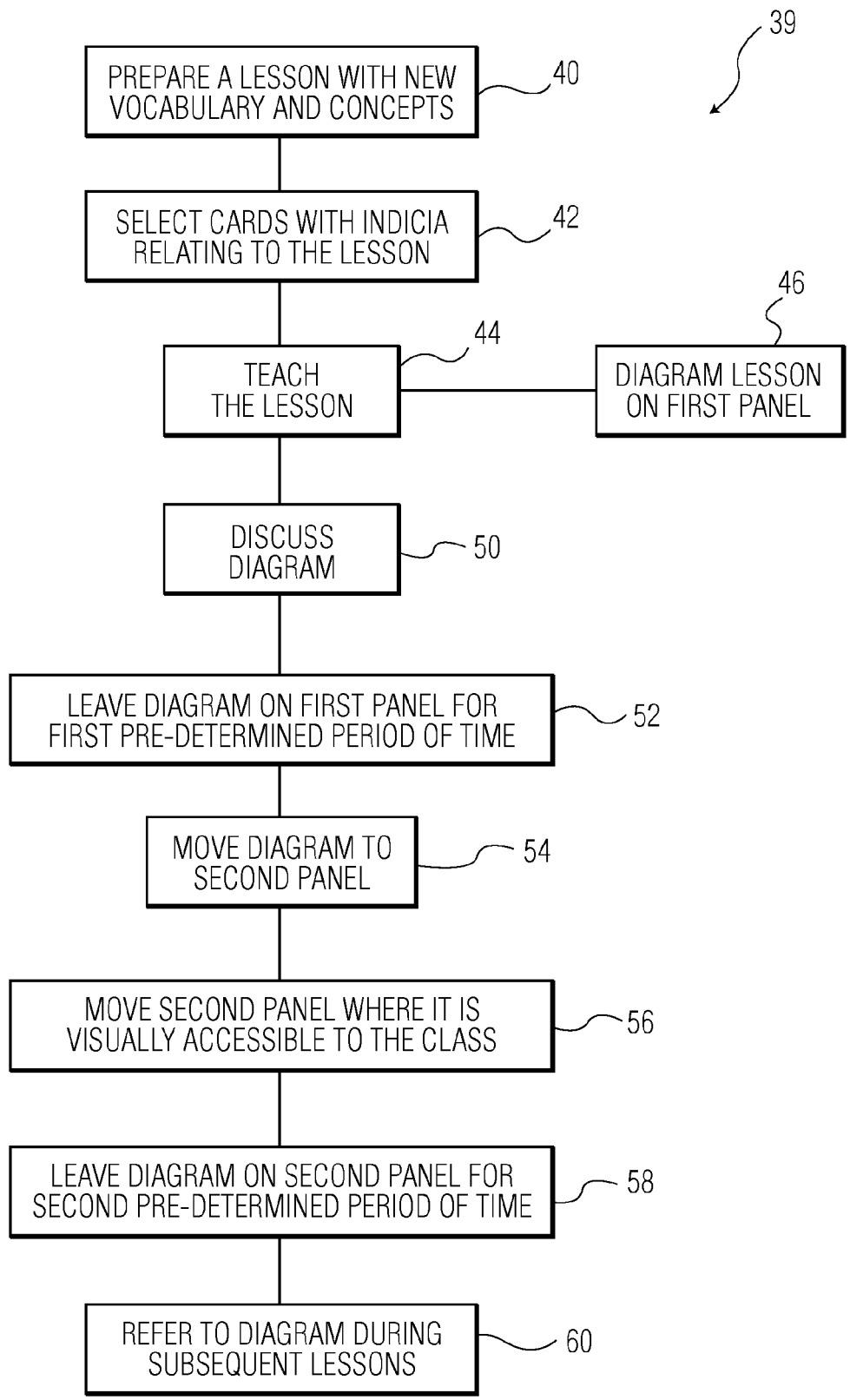
FIG. 8 is a flow diagram showing a method of teaching according to the first exemplary embodiment of the present invention.

FIG. 8 shows a method of educational instruction 39 according to the first exemplary embodiment of the present invention. The method 39 preferably begins with the preparation of a lesson plan by the teacher (27), which preferably introduces new or previously-learned vocabulary words and concepts (step 40). Once the lesson plan is prepared, the teacher selects one or more learning cards (12) for use in the lesson (step 42). If the lesson relates to biology, the teacher may select learning cards (12) with first indicia (14) relating to that topic (e.g., "photosynthesis," "Respiration," etc.). In any embodiment where the learning cards (12) are not pre-printed (i.e., blank, as discussed above), the teacher (27) preferably adds the relevant first and second indicia (14, 16) to the learning cards 12 before beginning to teach.

Once the teacher (27) has selected the learning cards (12), he or she begins to teach a lesson to the students (29) using the learning cards (12) and the panels (30, 32) (step 44). Before beginning to teach, however, the teacher (27) must insure that the panels (30, 32) are visible and accessible to the students (29). When the teacher (27) encounters a new vocabulary word or concept in the lesson, the teacher displays the card (12) relating to that vocabulary word to the students (29), by affixing the card to the first panel (30).

Thereafter, the teacher (27) and students (29) 'construct' a diagram of the lesson on the first panel (30) by placing the learning cards (12) introduced by the teacher (27) on the first panel 30 in a manner that relates to the lesson (which is why the first panel 30 is also referred to as the "Construxion Site") (step 46). The teacher may ask students to physically place the cards 12 on the first panel 30 explaining their rationale as they manipulate the cards 12, and/or may have the students suggest card placement to the teacher so that the teacher may place the cards 12 herself.

One example of how the teacher (27) and students (29) may construct or diagram a lesson is by grouping cards (12) with indicia (14, 16) that are related. For example, in a chemistry lesson, the teacher (27) may place the card (12) bearing the phrase "Avogadro's Number" on the first panel (30) in a group with a card (12) bearing the phrase "moles," and a card bearing the symbol "$6.022 \times 10^{23}$". The teacher (27) may ask students (29) to sit at their desks and write an explanation of the relationship among these terms, or may ask one or more students to come up to the first panel (30) and arrange them in a fashion that helps them verbally explain their relationship to the class. In this way, the teacher can assess for understanding in 'real time.'

Another example of diagramming a lesson is by constructing a flow diagram, or cycle, relating to the lesson. In the example shown in FIG. 6, the teacher (27) is teaching a lesson relating to the Ecosystem. She places the learning cards (12) to show the Ecosystem cycle. The learning cards (12) bearing the symbols "$CO_2$", "$H_2O$", etc. are arranged to show the reaction that is photosynthesis. Learning cards (12) with words and phrases such as "water cycle," "carbon cycle" and "oxygen cycle" are placed relative to the reaction. Regardless of the method used, the goal is for the teacher (27) and/or students (29) to study the learning cards (12) and move them around on the first panel (30) while explaining why they are being moved. As part of this process, the teacher (27) preferably encourages the students (29) to discuss the placement of the learning cards 12 on the first panel (30) (step 50). By physically placing, or by seeing the teacher (27) physically place, multiple learning cards (12) on the first panel (30) after each new word, symbol or value is introduced, the students (29) not only hear the vocabulary word (symbol or value), but also see the overall concept to which the word relates (e.g., the Ecosystem), which greatly improves the students' understanding. In essence, the lesson becomes interactive, stimulating and appealing to each students' (29) different learning styles, such as auditory, visual and kinesthetic.

After the diagramming is complete, the arrangement of cards (12) on the first panel (30) is left undisturbed by the teacher (27) for some first pre-determined period of time, so that the students (29) can examine it more closely (step 52) and/or complete an assignment using the vocabulary terms. The first pre-determined period of time will usually expire at the end of the lesson, period, or school day but may be any period of time that the teacher (27) chooses. After the first pre-determined period of time has elapsed, the entire diagram is moved from the first panel (30), to the second panel (32), preferably by the teacher (27), so as to maintain the integrity of the diagram (step 54). The second panel (32) is then displayed in a location which is visually accessible to the students (29) (step 56). As part of the method, the diagram is preferably left on the second panel (32) for a second pre-determined length of time which may be longer than the length of time the diagram appeared on the first panel (30), to thereby encourage extended discussion by the class as well as more accurate completion of written assignments (which is why the second panel 32 is also referred to as the "Converse & Convey Panel") (step 58). The second pre-determined period of time may be until an entire learning unit is finished, or even until the school year is finished, or any other period of time that the teacher (27) chooses. The cards (12) on the second panel (32) remain in their arrangement during subsequent lessons so that the teacher (27) and students (29) can refer to and discuss the constructed panel 32 as appropriate. Because the second panel (32) is large, the teacher (27) can compile multiple, constructed lessons on the second panel 32. In fact, the teacher may use multiple second panels (32) for larger (or more complicated) lessons. Optionally, the diagram may be left on the second panel (32) and used for teaching subsequent lessons (step 60). Cards 12 may be added to or subtracted from the second panel 32 to capture a "growing" knowledge base as class learning evolves.

As part of the method (39) according to the first exemplary embodiment of the present invention, the teacher (27) may leave the second panel (32) up during lessons relating to other subjects, which forces students (29) to relate concepts and vocabulary from one subject to another. For example, the teacher (27) or students (29) may have previously arranged the learning cards (12) in another class to show the reaction of $CO_2$ and water to form glucose and oxygen during a chemistry lesson about forming and balancing chemical equations. When learning about the photosynthesis reaction in biology, the subsequent biology lesson reinforces the prior chemistry lesson and puts both lessons in context and therefore, helps students (29) retain information that they previously learned and link the information to other subjects. Additionally, teachers may share the second panel (32) with other teachers to use in classrooms with other students who may be studying related topics. This builds conceptual connections from year to year and from classroom to classroom.

Further, if a previously-learned word is used differently in a subsequent lesson, the second panel (32) allows students (29) to see both usages at the same time, making it easier for students to learn that words often have multiple meanings. When a card (12) is used in subsequent lessons, the teacher (27) or students (29) can track its usage by writing when and how it was used on the front or back of the card (12). Learning vocabulary in context is supported by educational research.

Those of ordinary skill in the art will appreciate that there are many different methods for utilizing the system 10 according to the first exemplary embodiment of the present invention (besides the method 39 described above), to teach or diagram a lesson. These include, but are not limited to: (1) grouping learning cards 12 having first indicia 14 that relate to the same theme or subject, such as 'evolution' or 'exploration,' (2) grouping learning cards 12 using Venn Diagrams that compare and contrast the words, symbols or values shown by the first indicia 14 of the learning cards 12, (3) grouping learning cards 12 with a hierarchy diagram that has an umbrella category with sub-categories, (4) grouping learning cards 12 to show a cycle (e.g., the water or carbon cycle, etc.), (5) grouping learning cards 12 by reaction types or chemical compounds (e.g., oxides, salts, etc.), (6) grouping learning cards 12 with actual numbers and mathematical expressions (e.g., scientific notation symbols, indirect and direct proportion symbols), (7) grouping learning cards 12 with homonyms and homophones (e.g., "pet" as a noun and a verb); (8) adding photos, student drawings or pictures to either panel using the same fabric or magnetic adhesives, (9) creating card games and puzzles to be played at desks or on the floor, (10) giving each student a card to engage in role plays or skits to enact the concept, then creating a display on the second panel or video-recording the skit to capture inside the computer layout, (11) conducting classroom competitions for arrangements according to teacher-selected criteria (creativity, speed of construction, most cards used effectively, etc.), (12) rearranging another group's display on the first panel, giving verbal rationale for the modifications, (13) creating "silent constructions" where participants create displays that they design collaboratively, without speaking until the end of the activity, (14) integrate use of the tangible cards 12 and panels in the classroom 33 with the virtual cards 12 and panels on the computer, in order to link individual student homework or independent studies to classroom activities, which may be accomplished by scanning digital photos of displays on the first 30 or second 32 panel, or on multiple panels as desired, (15) coupling accessory packs with subject area card sets to enrich arrangements and displays, (16) conduct class debates or symposia requiring a "presentation" of a panel to audience members, etc. In accord with the above, those of ordinary skill in the art will readily understand that the system 10 (and method 39) of the first exemplary embodiment is flexible, and can be used creatively.

Those of ordinary skill in the art will also realize that in addition to the many ways to diagram a lesson, the first exemplary embodiment of the present invention may be used at varying times during the school day or a period. For example, at the beginning of class, the teacher (27) may introduce new vocabulary words, symbols, values or concepts that are essential to a reading activity, or a lesson. Once the teacher (27) introduces that new vocabulary words, symbols or values or concepts, she places the learning cards (12) in a random order on the first panel (30). As the teacher (27) teaches the lesson, she and the students (29) move the learning cards (12) into the position that represents what is being taught in the lesson. As the teacher (27) or the students (29) move the learning cards (12), the teacher explains why the movement is proper (or improper), and elicits responses from the students regarding the same. In this manner, the lesson becomes more of an interactive game, which may appeal more to certain students. Additionally, the teacher (27) may use the system 10 of the present invention at the end of class to reinforce vocabulary words, symbols, values or concepts that were learned during class, and in order to quickly assess the students' (29) understanding of the words, symbols, values and/or concepts. The teacher may wish to create assessments involving panels (30, 32) and/or cards (12) in order to gauge concept comprehension at any given point in the unit of study.

The system (10) of the present invention can also be used to reinforce students' (29) understandings of vocabulary words, symbols, values or concepts by having them create graphic organizers and concept maps of past panels and arrangements while explaining their understanding to other students and to the teacher (27). This exercise engages visual and verbal learners alike. It is also an excellent way to review past concepts that relate to current material.

The system (10) of the present invention may also be used as a writing prompt to prompt students' (29) writing during class for homework. Namely, the teacher (27) can use one card (12) to create a single writing prompt for the whole class, or give each student his or her own card.

The system (10) of the present invention can also be used for review sessions before exams. Before an exam, the teacher (27) can use the system to help students (29) review and recall the context in which they previously learned critical concepts and vocabulary. For example, the teacher (27) can give the student (29) a single card (12) as a prompt and ask them to recreate an organizational diagram that was used during the original lesson. The teacher (27) may also have the students (29) engage in reciprocal teaching activity whereby each student teaches their understanding of one of the concepts, and how it was previously arranged on the panels (30, 32) to another student. Or, the teacher (27) can have students (29) play word games with the learning cards (12) to reinforce their comprehension. The teacher (27) can also have students (29) create a diagram on the panels (30, 32) related to how they understand a word or concept, instead of using more words. Often students (29) understand the concept, but have difficulty putting their understanding to spoken or written words. Using the system (10), the teacher (27) can pair visual with verbal learners so that they use each other's strengths.

Figure 9:
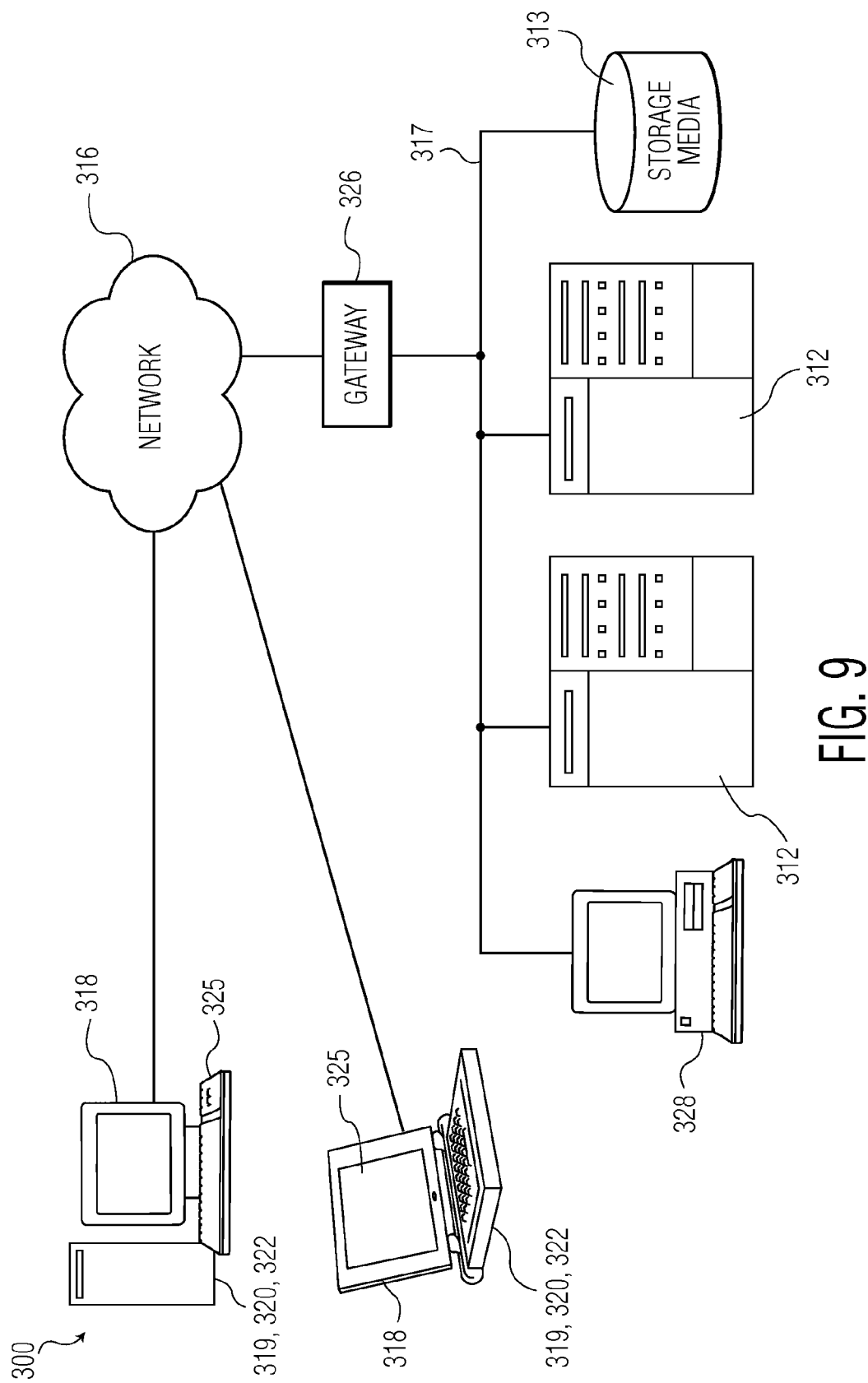
FIG. 9 is a client-server model showing a system of educational instruction according a second exemplary embodiment of the present invention.

FIGS. 9-12 show a client-server computer system 300 according to a second exemplary embodiment of the present invention, and a method 200 of using the same. In this exemplary embodiment, the system 300 is "virtual," as opposed to the physical system 10 described above with reference to the first exemplary embodiment. The system 300 preferably includes at least one computer software program for carrying out the features of the invention. The computer software program is preferably available for download from a network, or available over a network for real time use (as shown in FIG. 9).

FIG. 9 shows a client-server computer system 300 according to the second exemplary embodiment of the present invention which may be utilized to download the virtual system or use it in real time on a web page, over a network 316 and to carry out a method. The computer system 300 includes a plurality of server computers 312 and a plurality of user computers 325 (clients) and at least one workstation 328 and a storage media 313. The storage media 313 and work station 328 are optional. The server computers 312 comprise software (not shown) for communicating with user computers 325; for example, receiving requests from server computers' 325 web browsers, processing and in some cases, accessing the storage media 313, and responding to the request. One or more of the server computers 312 may comprise a daemon server. One or more of the server computers 312 preferably include at least one computer program for permitting the method 200 to be performed.

The user computers 325 may comprise any microprocessor controlled device that permits access to the network 316, including personal computers, workstations, servers, laptop computers, etc. Each of the user computers 325 preferably include storage media (not shown), as is known in the art. The server computers 312 and the user computers 325 may be connected by a network 316, such as for example, an Intranet or the Internet. The user computers 325 may be connected to the network 316 by a dial-up modem connection, a Local Area Network (LAN), a Wide Area Network (WAN), cable modem, digital subscriber line (DSL), or other equivalent connection means (whether wired or wireless). The servers 312 and a storage media 313 and workstation 328 may be interconnected by a LAN 317, which is coupled to a gateway 326. The gateway 326 facilitates access to the server computers 325, workstation 328 and storage media 313. In one embodiment, the LAN 317 conforms to the Transmission Control Protocol (TCI/IP).

Each user computer 325 preferably includes a video monitor 318 or display for displaying information. Additionally, each user computer 325 preferably includes an electronic mail (e-mail) program 319 (e.g., Microsoft Outlook®) and a browser program 320 (e.g. Microsoft Internet Explorer®, Netscape Navigator®, etc.), as is well known in the art.

One or more of the server computers 312 preferably include a program module 322 (explained in detail below) which allows the user computers 325 to communicate with the server computers and each other over the network 316. The program module 322 may include program code, preferably written in Hypertext Mark-up Language (HTML), JAVA™ (Sun Microsystems, Inc.), Active Server Pages (ASP), Extensible Markup Language (XML), and/or any other such software language known to those of ordinary skill in the art, which allows the user computers 325 to access the program module through browsers 320 (i.e., by entering a proper Uniform Resource Locator (URL) address).

The exemplary program module 322 preferably includes program code for facilitating a method of educational instruction among the server computers 312 and user computers 325, as explained in detail below. As explained in more detail below, the program code is preferably capable of providing a web page (i.e., www.teachersforlearners.com, or www.educhange.com) to one or more user computer 325, permitting accessing of a database (e.g., database 313) containing virtual learning cards 120 and virtual education panels 130 (FIGS. 11-12), permitting the selection of virtual learning cards 120 (from, for example, the database 313), allowing the placement of selected virtual learning cards 120 on at least one virtual education panel 130, permitting the saving of a configuration of the at least one virtual education panel 130 with the virtual learning cards 120 disposed thereon, and permitting the loading and display of the saved configuration.

At least one of the server computers 312 also includes a storage media or database 313 for storing information utilized by the program module 322 in order to carry out a method 200 for educational instruction. For example, information regarding different virtual education panels 130 and virtual learning cards 120 for use in teaching and instruction may be stored in the database 313 (or any other suitable database). Although the database 313 is shown as being external, those of skill in the art would recognize that the database 313 may be internal to the server 312. Additionally, although the database 313 is shown as a single database, those of ordinary skill in the art will realize that the present computer system 300 may include one or more databases coupled to the network 316.

Figure 10:
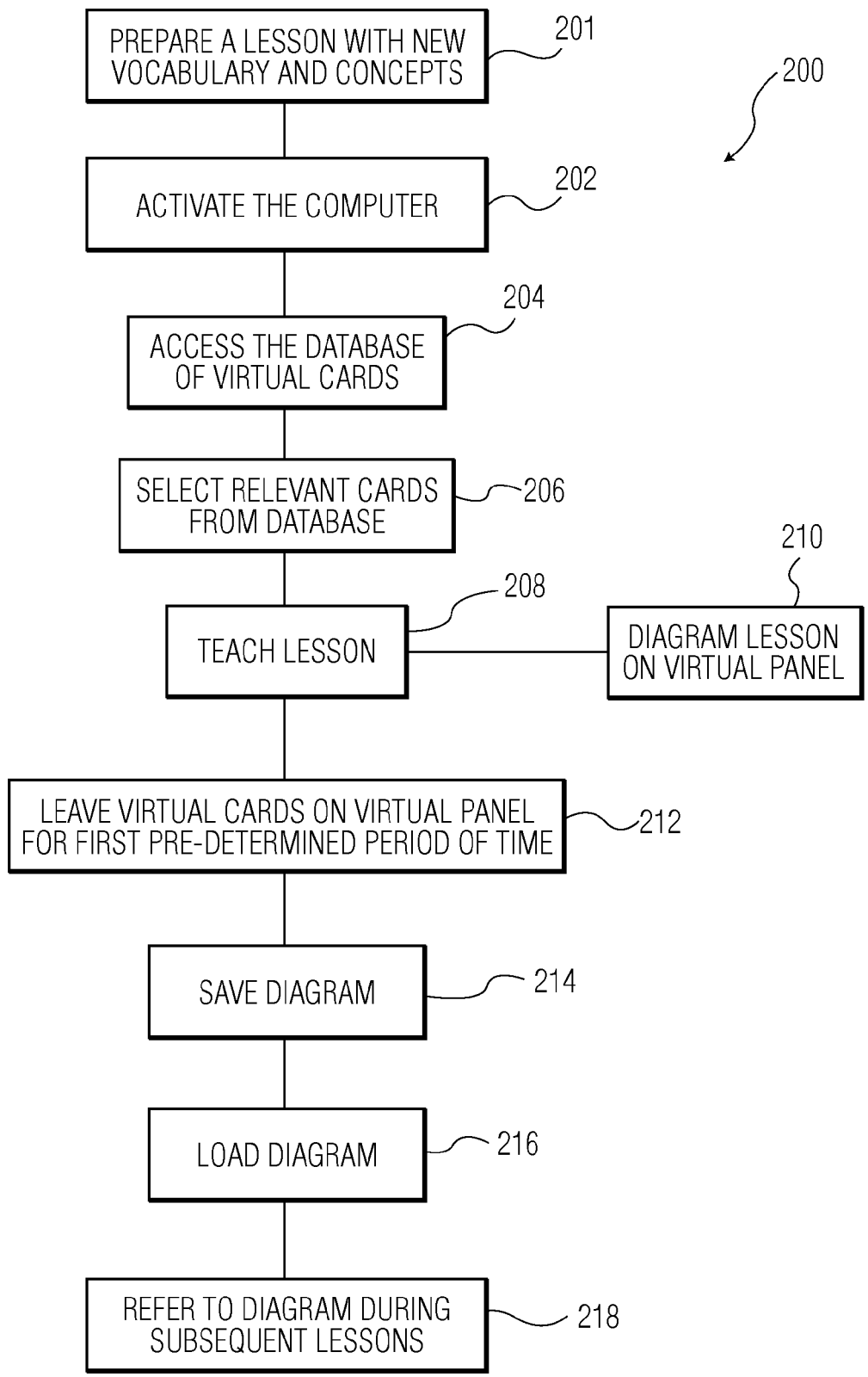
FIG. 10 is a flow diagram showing a method of educational instruction according to a second exemplary embodiment of the present invention.
Figure 11:
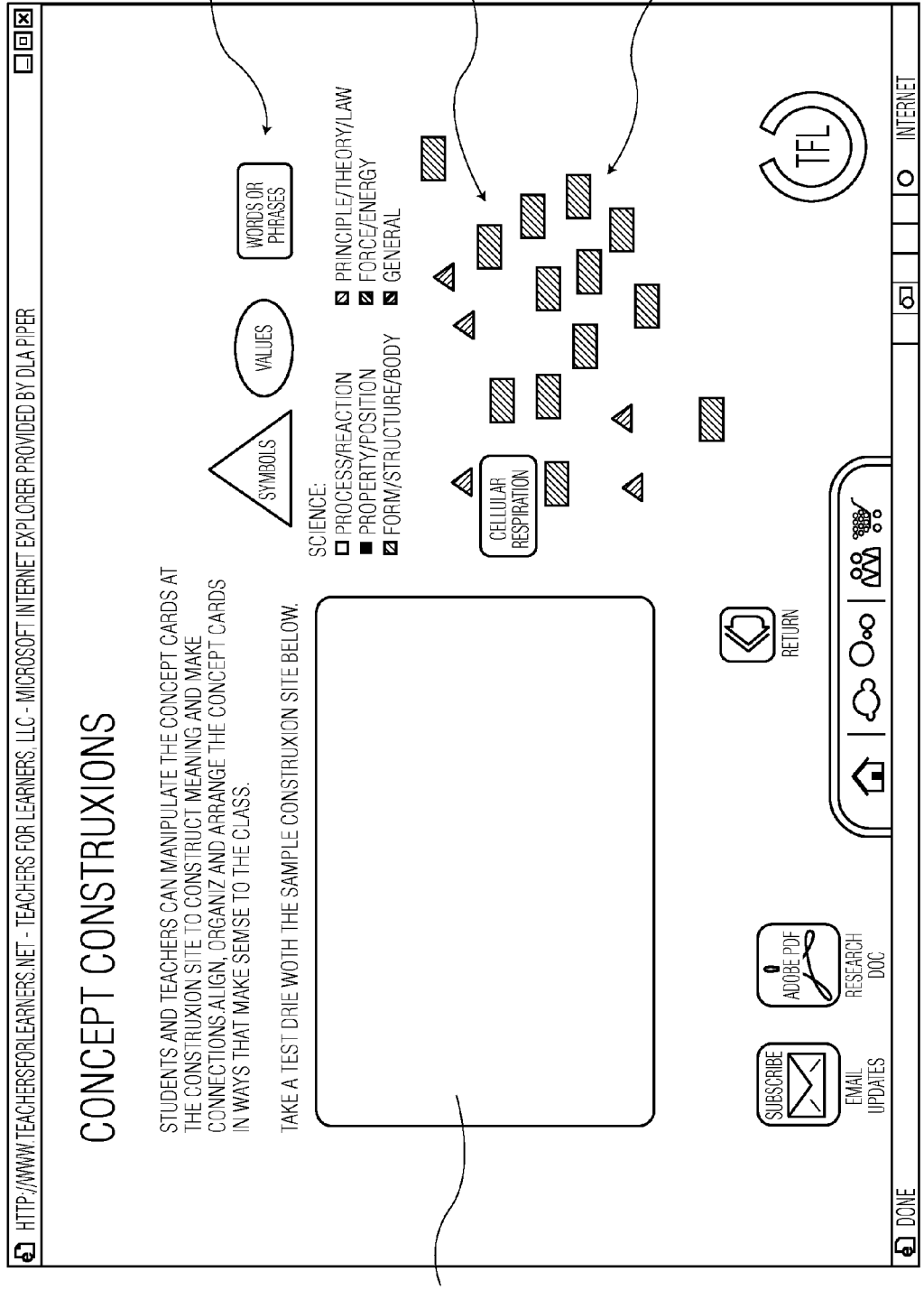
FIG. 11 is a top plan view of a first display screen used in the second exemplary embodiment of the present invention.
Figure 12:
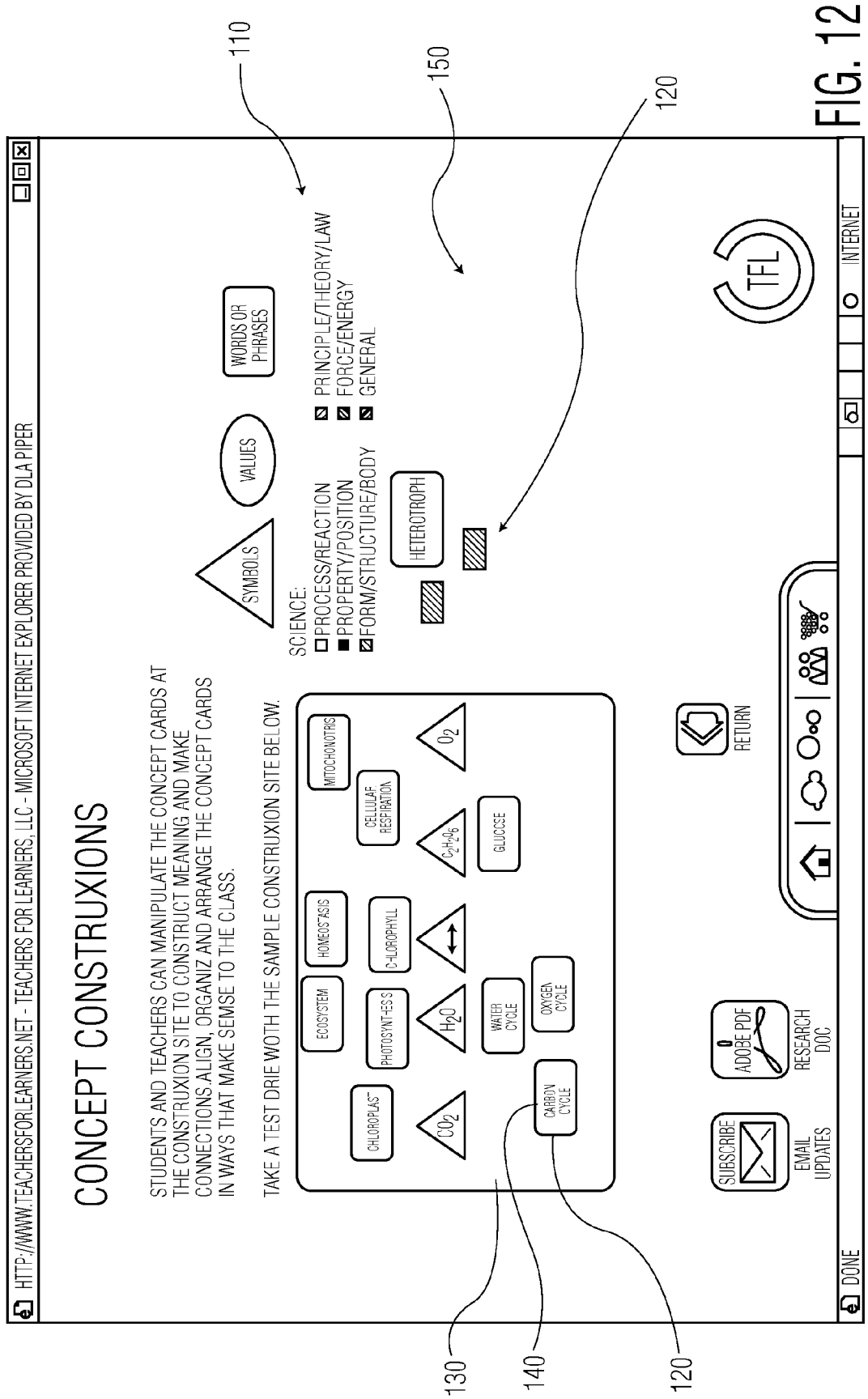
FIG. 12 is a top plan view of a second display screen used in the second exemplary embodiment of the present invention.

FIG. 10 shows a method for educational instruction 200 which may be partially implemented as computer software and saved on the program module 322 of the client-server computer system 300, or in any other location known to those of ordinary skill in the art. The method 200 for educational instruction preferably includes a first step of preparing a lesson plan (step 201). The lesson plan preferably is crafted to introduce new vocabulary words and concepts. Once the lesson plan is created, the instructor or teacher 27 (i.e., "user") activates 202 one of the user computers 325 connected to the network 316, and navigates to a specific website using the browser program 320 (e.g., www.teachersforlearners.com, www.educhange.com) where a virtual education panel 130 (e.g., Converse & Convey Panel, Construxion Site, etc.) and virtual learning cards 120 are located (step 202). Next, the teacher (27) accesses the database 313 of virtual learning cards 120, by for example, selecting an icon on the computer screen 318 of the user computer 325 (step 204). In one exemplary embodiment, the teacher or user (27) must pay to access the website, or for using a database 313 of learning cards 120 or virtual panels 130, sounds, graphics, etc. From this database 313, the teacher (27) can select specific virtual learning cards 120 related to the lesson plan, by for example, selecting each such virtual learning cards 120 and dragging the learning cards 120 onto the virtual education panel 130 (step 206). FIGS. 11 and 12 show, respectively, a blank virtual education panel 130 with various virtual learning cards 120 placed to one side 150, and a virtual education panel 130 which has virtual learning cards 120 disposed thereon.

After placing the specific virtual learning cards 120 for the lesson plan on the virtual education panel 130, the teacher (27) preferably teaches a lesson using the virtual learning cards 120 and the virtual education panel 130 as a reference (step 208). During the lesson, the teacher (27) may diagram the lesson on the virtual education panel 130 by placing the virtual learning cards 120 in a predetermined configuration (step 210). The teacher (27) may place the virtual learning cards 120 on the virtual panels 130 in any manner as described in connection with the first exemplary embodiment described above.

After the teacher (27) has completed the lesson, the virtual learning cards 120 are preferably left on the virtual education panel 130 for a predetermined period of time, so that the students (29) may inspect the learning cards 120, the panel 130, and the configuration of the learning cards on the panel (step 212). Additionally, the virtual education panel 130, and the configuration of the virtual learning cards 120 thereon, may be saved for future reference, by for example, selecting an icon on the screen 318 of the user computer 325 entitled "SAVE" (step 214). Once saved, the virtual education panel may be retrieved for future lessons, by for example, selecting an icon on the screen 318 of the user computer 325 entitled "LOAD" (steps 216, 218).

The software program which carries out the above-referenced method of educational instruction 200 may comprise at least one code segment for producing an interactive interface 110 on a display screen of the video monitor 318 of one of the user computers 325 (i.e., displaying the virtual education panels 130, virtual learning cards 120, and various other buttons and icons).

FIG. 11 shows an interactive display 110 which includes a virtual education panel 130, a plurality of virtual learning cards 120 disposed on virtual panel 130. The virtual learning cards 120 function as the physical learning cards 10 in the first exemplary embodiment. Thus, they have first indicia 140 relating to various subjects such as chemistry, biology, math, history, language, reading, grammar, etc. The learning cards have various shapes and various colors 160 corresponding to the indicia 140 thereon. In another embodiment, the database contains blank virtual learning cards 120 on which students (29) or the teacher (27) may affix indicia 140.

The software program may additionally include at least one code segment for allowing a user or teacher (27) to access the virtual learning cards 120 from a database of virtual learning cards, and manipulate them (i.e., drag and drop them to the virtual panel 130). The software program may also comprise a code segment which allows the storage of the virtual learning cards 120, the virtual panel 130 and the virtual education panel 130 in storage media (e.g., hard drive, CD-ROM, etc.). The software program may also comprise a code segment which allows the retrieval of previously stored configurations of virtual learning cards 120, virtual panels 130 and virtual education panels 130 from the storage media, and display on the display screen 110. Preferably, this code segment is capable of displaying the selected, saved, at least one virtual panel along with a blank virtual panel and learning cards selected from the database during these subsequent lessons so that students (29) or teachers can diagram new lessons while referring to saved ones.

The above-described storage media (not shown) may comprise an internal or external hard drive coupled to the user computer 325, and/or permanent or removable media (such as a CD-ROM, DVD-ROM, Blu-Ray™ disc, HD-DVD disc, "Thumb" drive, Flash Drive, etc). The storage media may also comprise a remote storage device, such as the database 313 of the server computers 312, or any other remote storage device coupled to the user computer 325 via hard wire or wireless connection. The display screen 318 of the user computer 325 may include any suitable display screen coupled to the user computer 325 via hard wire or wireless connection, such as for example, a Cathode Ray Tube (CRT) monitor, a Liquid Crystal Display (LCD) monitor, a plasma monitor, a projector and screen, and/or any other such display device known to those of ordinary skill in the art. Preferably, the display screen 110 should be large enough to be viewed by an entire class of students 29, but may be smaller where students 29 work in smaller groups, or individually.

In addition to the above-described elements, the software program may optionally include a code segment capable of playing audio and/or visual media in response to user/teacher (27) commands. For example, to make learning more interactive, the software program may play sounds or video when students (29) or the user/teacher (27) places virtual learning cards 120 in the proper location on the virtual panel 130 or virtual education panel 130, or may display images relevant to the lesson (e.g., pictures of the sun and a planet, if the lesson involves the vocabulary word "photosynthesis").

In another embodiment, the system of the present invention is contained on a software program that can be downloaded or uploaded to a computer wherein the user does not have to access a website after uploading or downloading the software. This embodiment functions as does the embodiments described above. However, the learning cards and virtual panels are located on the software and can be saved onto the computer's database. The database may be any listed above and known in the art. The database may be remote and coupled to a computer via a hard-wire or wireless inter or intranet connection, via a server. The software has a means for recalling saved data from the storage media, as is known in the art. The teacher (27) and students (29) would preferably utilize this exemplary embodiment as described above.

One of skill in the art would realize that the second exemplary embodiment described with respect to FIGS. 9-11 is flexible, like the first exemplary embodiment described with respect to FIGS. 1-8, and therefore, may be used by the teacher 27 or students 29 in the same manners as described above with regard to the first exemplary embodiment. Further, those of ordinary skill in the art will realize that the learning cards 12 described above correspond to the virtual learning cards 120 of the second exemplary embodiment.

In sum, the above-described system (10, 300) and method (39, 200): (1) is interactive, stimulating and appeals to students with different learning styles, such as auditory, visual and kinesthetic; (2) is not limited to teaching a foreign language but teaches vocabulary relating to other subjects as well; (3) teaches vocabulary in the service of conceptual knowledge-building; (4) teaches vocabulary in the context in which it is used; (5) provides varying contexts for words, especially those with multiple meanings; (6) can be used to teach vocabulary utilizing various pedagogical approaches; (7) forces students to consistently use or revisit the words during subsequent lessons relating to the same or different subjects; and (8) prompts students to use vocabulary of the academic subject in their speech and writing.

A variety of modifications to the embodiments described will be apparent to those skilled in the art from the disclosure provided herein. Thus, the invention may be embodied in other specific forms without departing from the spirit or essential attributes thereof and, accordingly, reference should be made to the appended claims, rather than to the foregoing specification, as indicating the scope of the invention.

I claim:

1. A system for educational instruction comprising:
    a plurality of sets of learning cards, each set corresponding to a particular subject matter area, wherein each set of the plurality of sets of learning cards includes a plurality of learning cards, each card including at least one color disposed thereon corresponding to a particular conceptual category;
    a first education panel; and,
    a second education panel;
    wherein each learning card may be coupled to the first education panel or second education panel during the teaching of a lesson related to the particular conceptual category,
    wherein each learning card has a predetermined shape which indicates a type of terminology of the card,
    and wherein each learning card has a first indicia disposed thereon, the indicia corresponding to the subject matter represented by the shape of the card and also corresponding to the conceptual category represented by the color of the card.

2. The system of claim 1, wherein the type of terminology comprises words or phrases.

3. The system of claim 2, wherein the predetermined shape of at least one learning card is rectangular.

4. The system of claim 1, wherein the type of terminology comprises symbols.

5. The system of claim 4, wherein the predetermined shape of at least one learning card is triangular.

6. The system of claim 4, wherein the symbols comprise symbols, abbreviations and notations.

7. The system of claim 1, wherein the type of terminology comprises values.

8. The system of claim 7, wherein the predetermined shape of at least one learning card is oval.

9. The system of claim 7, wherein the values comprise one selected from the group consisting of: numbers, time intervals, formulas and quantities.

10. The system of claim 1, wherein the at least one color corresponds to a conceptual category selected from the group consisting of: form, structure or body; process or reaction; principle, theory or law; force or energy; property or position; and general principles.

11. The system of claim 10, wherein the conceptual category of form, structure or body corresponds to the color red.

12. The system of claim 10, wherein the conceptual category of process or reaction corresponds to the color green.

13. The system of claim 10, wherein the conceptual category of principle, theory or law corresponds to the color blue.

14. The system of claim 10, wherein the conceptual category of force or energy corresponds to the color orange.

15. The system of claim 10, wherein the conceptual category of property or position corresponds to the color brown.

16. The system of claim 10, wherein the conceptual category of general principles corresponds to the color black.

17. The system of claim 1, wherein the first indicia comprises one selected from the group consisting of: at least one word or phrase, at least one value and at least one symbol.

18. The system of claim 1, wherein the shape of the at least one learning card is selected from the group consisting of: rectangles, triangles and ovals.

* * * * *